(12) United States Patent
Murakami

(10) Patent No.: US 8,996,076 B2
(45) Date of Patent: Mar. 31, 2015

(54) DEVICE, METHOD, AND STORAGE MEDIUM STORING PROGRAM

(71) Applicant: Kyocera Corporation, Kyoto-shi, Kyoto (JP)

(72) Inventor: Hideko Murakami, Yokohama (JP)

(73) Assignee: Kyocera Corporation, Kyoto (JP)

( * ) Notice: Subject to any disclaimer, the term of this patent is extended or adjusted under 35 U.S.C. 154(b) by 79 days.

(21) Appl. No.: 13/761,685

(22) Filed: Feb. 7, 2013

(65) Prior Publication Data

US 2013/0203471 A1 Aug. 8, 2013

(30) Foreign Application Priority Data

Feb. 7, 2012 (JP) ................................. 2012-024324

(51) Int. Cl.
*H04B 1/38* (2006.01)
*H04M 1/02* (2006.01)
*H04M 1/725* (2006.01)

(52) U.S. Cl.
CPC ........ *H04M 1/0266* (2013.01); *H04M 1/72522* (2013.01)
USPC ........................................................ 455/573

(58) Field of Classification Search
CPC ......... H02J 7/025; H02J 7/0044; H02J 17/00; H02J 7/0054; H02J 7/0042; H02J 7/35; H02J 2007/0062; H02J 5/005; H02J 7/00; H02J 2007/0096; H02J 7/0068; H02J 7/0027; H02J 7/0047; H02J 7/0052
USPC .................................................. 455/566, 573
See application file for complete search history.

(56) References Cited

U.S. PATENT DOCUMENTS

| | | | | |
|---|---|---|---|---|
| 2002/0164979 | A1* | 11/2002 | Mooney et al. ................ | 455/417 |
| 2003/0189418 | A1* | 10/2003 | Schinner ....................... | 320/136 |
| 2005/0009496 | A1* | 1/2005 | Chen ............................. | 455/334 |
| 2008/0307243 | A1* | 12/2008 | Lee ............................... | 713/320 |
| 2011/0099392 | A1* | 4/2011 | Conway ........................ | 713/300 |

FOREIGN PATENT DOCUMENTS

JP 2002-084362 A 3/2002

* cited by examiner

*Primary Examiner* — Mazda Sabouri
*Assistant Examiner* — Edward Zhang
(74) *Attorney, Agent, or Firm* — Lowe Hauptman & Ham, LLP

(57) ABSTRACT

According to an aspect, a device includes a battery, a display, and a controller. When a charge of the battery is started, the controller causes the display to display a screen including one or more options for stopping a function in which power is consumed.

5 Claims, 7 Drawing Sheets

FIG.2

| FUNCTION | POWER CONSUMPTION |
|---|---|
| HIGH-SPEED MOBILE COMMUNICATION | xxxx |
| WIRELESS LAN | xxxx |
| GPS | xxxx |
| PEDOMETER | xxxx |
| AUTO-SYNC | xxxx |
| ... | ... |

9d

DEVICE, METHOD, AND STORAGE MEDIUM STORING PROGRAM

CROSS-REFERENCE TO RELATED APPLICATIONS

This application claims priority from Japanese Application No. 2012-024324, filed on Feb. 7, 2012, the content of which is incorporated by reference herein in its entirety.

BACKGROUND

1. Technical Field

The present application relates to a device, a method, and a storage medium storing therein a program. More particularly, the present application relates to a device including a battery, a method of controlling the device, and a storage medium storing therein a program for controlling the device.

2. Description of the Related Art

Most of mobile type electronic devices are operated by power stored in a chargeable battery. A technology for reducing a charge time of a battery is proposed in order to improve the usability of these electronic devices. For example, JP-A-2002-084362 proposes a technology for reducing power supplied to a lighting unit when a charging power to a battery is detected.

Users of the electronic device may wish to operate the electronic device during charging or to cause the electronic device to perform processes during charging. In this case, if the function of the electronic device is limited during charging without user's intention as is the technology, then this may impair convenience for the users.

For the foregoing reasons, there is a need for a device, a method, and a program capable of reducing a charge time according to its use status.

SUMMARY

According to an aspect, a device includes a battery, a display, and a controller. When a charge of the battery is started, the controller causes the display to display a screen including one or more options for stopping a function in which power is consumed.

According to another aspect, a method is for controlling a device with a battery and a display. The method includes: detecting a start of charging the battery; and displaying, when the charge of the battery is started, a screen on the display. The screen includes one or more options for stopping a function in which power is consumed.

According to another aspect, a non-transitory storage medium stores a control program. When executed by a device with a battery and a display, the program causes the device to execute: detecting a start of charging the battery; and displaying, when the charge of the battery is started, a screen on the display, the screen including one or more options for stopping a function in which power is consumed.

BRIEF DESCRIPTION OF THE DRAWINGS

FIG. 2 is a diagram illustrating an example of power consumption information;

DETAILED DESCRIPTION

Exemplary embodiments of the present invention will be explained in detail below with reference to the accompanying drawings. A mobile phone will be explained below as an example of a device provided with a battery.

Figure 1:
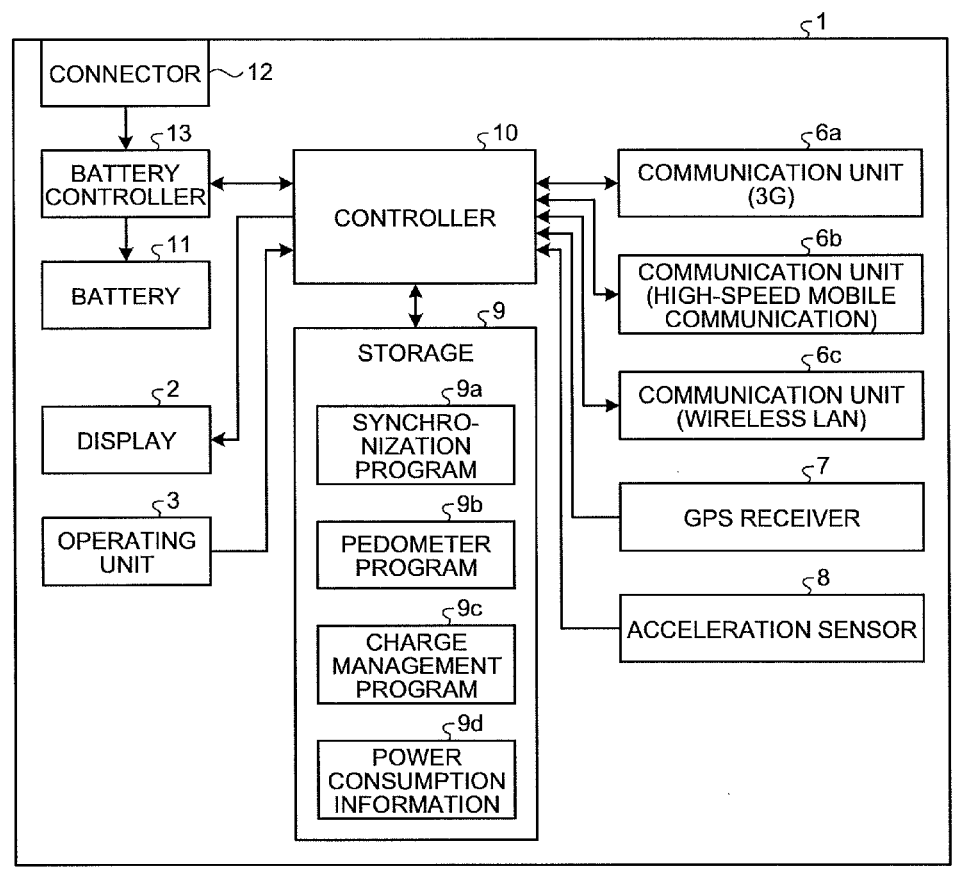
FIG. 1 is a block diagram of a mobile phone according to an embodiment.

A configuration of a mobile phone 1 according to an embodiment will be explained below with reference to FIG. 1. FIG. 1 is a block diagram of the mobile phone 1. As illustrated in FIG. 1, the mobile phone 1 includes a display 2, an operating unit 3, a communication unit 6a, a communication unit 6b, a communication unit 6c, a Global Positioning system (GPS) receiver 7, an acceleration sensor 8, a storage 9, a controller 10, a battery 11, a connector 12, and a battery controller 13.

The display 2 includes a display device such as a Liquid Crystal Display (LCD), an Organic Electro-Luminescence Display (OELD), or an Inorganic Electro-Luminescence Display (IELD). The display 2 displays texts, images, symbols, graphics, and so on.

The operating unit 3 is operated by a user. The operating unit 3 includes one or more devices capable of detecting a user's operation, such as a key, a button, and a touch screen. The display 2 and the operating unit 3 may be integrally configured like a touch screen display in which a display device and a touch screen are arranged in an overlapped manner.

The communication units 6a to 6c perform wireless communication. A communication system supported by these communication units is a wireless communication standard. The wireless communication standard includes a cellular-phone communication standard such as 2G, 3G, and 4G. Examples of the cellular-phone communication standard include, but not limited to, Long Term Evolution (LTE), Wideband Code Division Multiple Access (W-CDMA), CDMA 2000, Personal Digital Cellular (PDC), Global System for Mobile Communications (GSM), and Personal Handy-phone System (PHS). Examples of the wireless communication standard also include, but not limited to, Worldwide Interoperability for Microwave Access (WiMAX), IEEE 802.11, Bluetooth, Infrared Data Association (IrDA), and Near Field Communication (NFC).

In the present embodiment, the communication unit 6a supports a 3G communication standard, the communication unit 6b supports high-speed mobile communication (LTE or WiMAX), and the communication unit 6c supports wireless LAN (IEEE 802.11). The number of communication units is not limited to three, and the communication standards supported by the communication units may be arbitrarily selected. In the explanation below, the communication units 6a to 6c may be called "communication unit 6" without specifying which is which.

The GPS receiver 7 detects a current location based on a signal sent from a GPS satellite. The acceleration sensor 8 detects a direction and a magnitude of an acceleration applied to the mobile phone 1.

The storage 9 stores therein programs and data. Also, the storage 9 is used as a work area that temporarily stores results of processes by the controller 10. The storage 9 may include an arbitrary non-transitory storage medium such as a semiconductor storage medium and a magnetic storage medium. The storage 9 may include a plurality of types of storage media. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Examples of the programs stored in the storage 9 include a synchronization program 9a, a pedometer program 9b, and a charge management program 9c. These programs may be installed into the storage 9 through wireless communication by the communication unit 6 or through a non-transitory storage medium. Examples of the data stored in the storage 9 include power consumption information 9d.

The synchronization program 9a synchronizes data stored in the storage 9 and data stored in a server through wireless communication by the communication unit 6. That is, the synchronization program 9a executes a synchronous process in which if one of the same type of data stored in the storage 9 and the server is updated, then the update will be reflected in the other. The synchronous process performed by the synchronization program 9a is executed at a predetermined interval. The data to be synchronized through the synchronous process performed by the synchronization program 9a is previously determined.

The pedometer program 9b counts steps of a holder of the mobile phone 1 based on the acceleration detected by the acceleration sensor 8. In the present embodiment, it is assumed that the mobile phone 1 is set so that the synchronization program 9a and the pedometer program 9b are automatically executed upon the start-up of the mobile phone 1 and these programs are always on until any instruction is input.

The charge management program 9c provides a function of managing the charge of the battery 11. Specifically, when the charge of the battery 11 is started, the charge management program 9c presents a time required to charge the battery 11 (hereinafter, "charge time") and options to reduce the charge time to the user. Each of the options is associated with a function in which power is consumed during charging and is used to stop or activate the corresponding function.

Values related to power consumption of the mobile phone 1 are recorded in the power consumption information 9d. FIG. 2 is a diagram illustrating an example of the power consumption information 9d. As illustrated in FIG. 2, the power consumption information 9d stores therein power consumption per unit time for each function provided in the mobile phone 1. The power consumption stored in the power consumption information 9d may be indicated by a preset fixed value or by an actual measurement value measured during operation of the mobile phone 1.

In the example of FIG. 2, the power consumption information 9d stores therein power consumption of a high-speed mobile communication function, power consumption of a wireless LAN function, power consumption of a GPS function, power consumption of a pedometer function, and power consumption of an automatic synchronization function. The power consumption of the high-speed mobile communication function is the amount of power consumed when the communication unit 6b is kept active. The power consumption of the wireless LAN function is the amount of power consumed when the communication unit 6c is kept active. The power consumption of the GPS function is the amount of power consumed when the GPS receiver 7 is kept active. The power consumption of the pedometer function is the amount of power consumed when the pedometer program 9b is kept active. The power consumption of the automatic synchronization function is the amount of power consumed when the synchronization program 9a is kept active.

The controller 10 is a processing unit. Examples of the processing unit include, but not limited to, a Central Processing Unit (CPU), a System-on-a-Chip (SoC), a Micro Control Unit (MCU), and a Field-Programmable Gate Array (FPGA). The controller 10 integrally controls operations of the mobile phone 1 to implement various functions.

Specifically, the controller 10 executes instructions included in the program stored in the storage 9 while referring to the data stored in the storage 9 as required. The controller 10 then controls a function unit according to the data and the instructions to thereby implement the various functions. Examples of the function unit include, but not limited to, the display 2 and the communication unit 6. The controller 10 may change the control according to a detection result of a detector. Examples of the detector include, but not limited to, the operating unit 3 and the acceleration sensor 8.

For example, the controller 10 executes the synchronization program 9a to implement the synchronous process. The controller 10 executes the pedometer program 9b to implement a count process of steps. The controller 10 executes the charge management program 9c to implement presentation of the options to reduce the charge time.

Part or all of the programs and the data stored in the storage 9 in FIG. 1 may be downloaded from any other device through wireless communication by the communication unit 6. Part or all of the programs and the data stored in the storage 9 in FIG. 1 may be stored in the non-transitory storage medium that can be read by, the reader included in the storage 9. Part or all of the programs and the data stored in the storage 9 in FIG. 1 may be stored in the non-transitory storage medium that can be read by a reader connected to the connector 12. Examples of the non-transitory storage medium include, but not limited to, an optical disc such as CD, DVD, and Blu-ray, a magneto-optical disc, a magnetic storage medium, a memory card, and a solid-state storage medium.

The battery 11 is a chargeable power supply. The power stored in the battery 11 is supplied to the components of the mobile phone 1. The connector 12 is a terminal to receive power supply from an external device. The connector 12 may be a dedicated terminal for receiving power supply or may be a terminal available for data exchange such as a Universal Serial Bus (USB).

The battery controller 13 controls the charge of the battery 11. For example, when a power supply is started from an external device via the connector 12, the battery controller 13 detects the power supply and starts charging the battery 11. Thereafter, the battery controller 13 stops charging when the battery 11 is fully charged, and resumes charging when the remaining amount of the battery 11 becomes less than a threshold.

The configuration of the mobile phone 1 illustrated in FIG. 1 is only an example, and therefore it can be modified as required within a scope that does not depart from the gist of the present invention.

Figure 3:
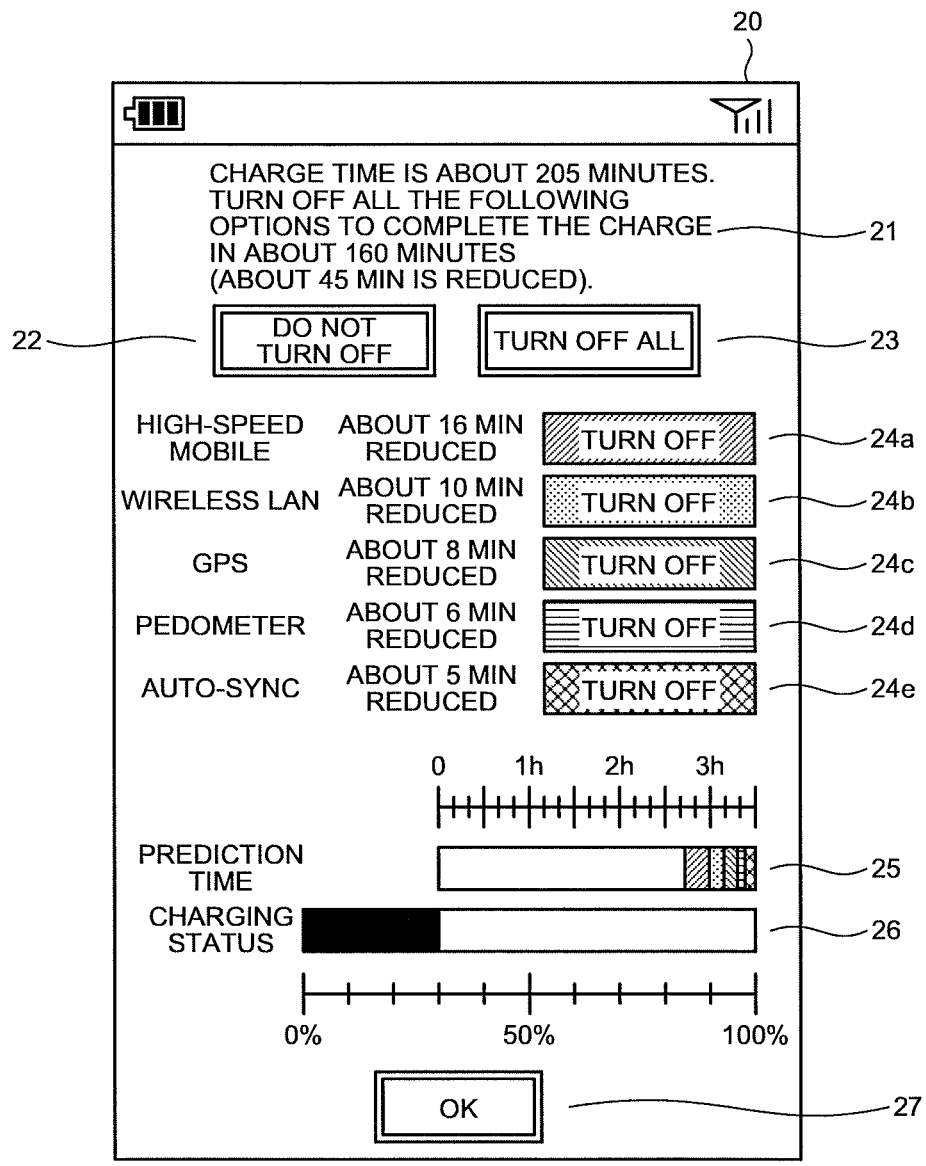
FIG. 3 is a diagram illustrating an example of a management screen appearing at the time of starting a charge.
Figure 4:
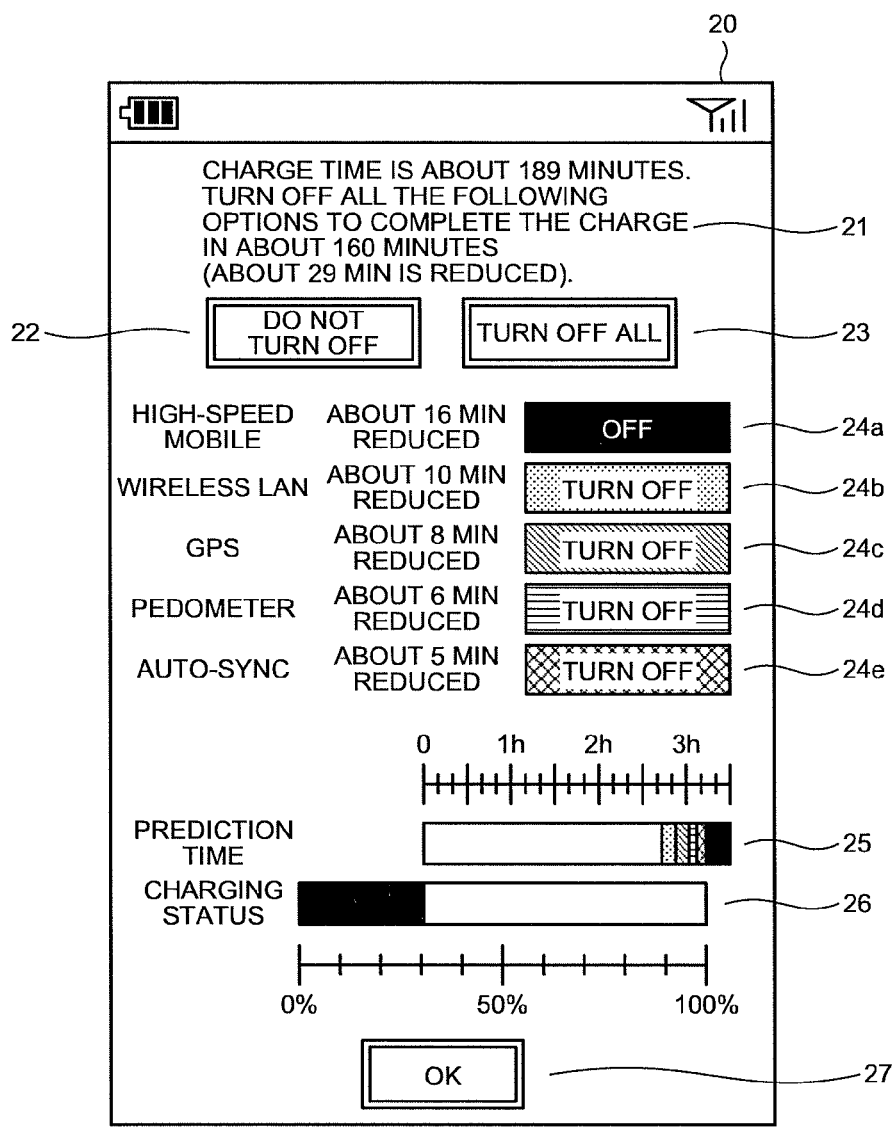
FIG. 4 is a diagram illustrating an example of the management screen when one of options is enabled.
Figure 5:
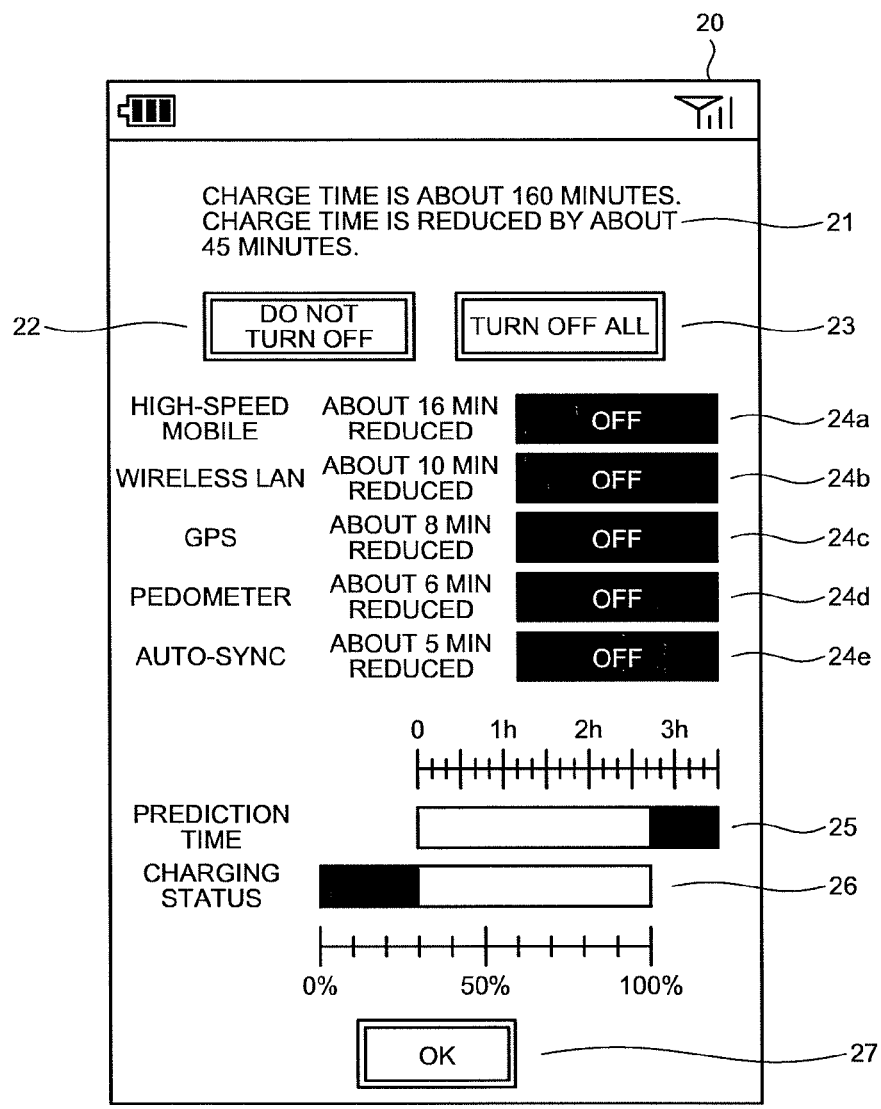
FIG. 5 is a diagram illustrating an example of the management screen when all of the options are enabled.

Then the control executed by the controller 10 based on the function provided by the charge management program 9c during charging of the battery 11 will be explained below with reference to FIG. 3 to FIG. 5. FIG. 3 is a diagram illustrating an example of a management screen 20 appearing at the time of starting a charge. FIG. 4 is a diagram illustrating an example of the management screen 20 when one of options is enabled. FIG. 5 is a diagram illustrating an example of the management screen 20 when all of the options are enabled.

When the charge of the battery 11 is started, the controller 10 displays the management screen 20 as illustrated in FIG. 3 on the display 2. The start of the charge of the battery 11 is detected in cooperation with the battery controller 13. The controller 10 may be configured to display the management screen 20 on the display 2 when the charge of the battery 11 is started and it is determined that an option is effective enough to reduce the charge time. It is determined whether an option is effective enough to reduce the charge time based on, for example, whether a difference between a charge time in the current setting and a charge time when all of the options are enabled is greater than a threshold.

FIG. 3 is an example of the management screen 20 appearing when none of the options to reduce the charge time are enabled. The management screen 20 includes a message 21, a button 22, a button 23, options 24a to 24e, a histogram 25, a histogram 26, and a button 27.

The message 21 represents a charge time in the current setting and a reduced charge time when the options are enabled. The charge time in the current setting can be calculated by using any arbitrary known method. The reduced charge time can be calculated by acquiring power consumption per unit time of a function corresponding to an option from the power consumption information 9d and using the acquired power consumption.

The button 22 is used when all of the options are disabled. When the button 22 is operated by the user, the controller 10 disables all of the options 24a to 24e. In the present embodiment, disabling an option means that the function corresponding to the option is kept executed. The button 23 is used when all of the options are enabled. When the button 23 is operated by the user, the controller 10 enables all of the options 24a to 24e. In the present embodiment, enabling an option means that the function corresponding to the option is kept stopped.

Each of the options 24a to 24e corresponds to one of the functions in which power is consumed, and includes a name of a corresponding function, a value indicating the magnitude of effect of reducing the charge time when the option is enabled, and an operation item to switch between enabling and disabling an option. In the present embodiment, the effect of reducing the charge time when an option is enabled is represented as a reduced charge time. However, the effect may be represented in any manner if the magnitude of its effect can be easily compared with that of other option.

When the management screen 20 is to be displayed, the controller 10 switches between enabling and disabling each of the options 24a to 24e according to the status of the corresponding function. Specifically, when the corresponding function is activated, the controller 10 disables the option. In the present embodiment, when the option is disabled, a text "Turn OFF" indicating that the corresponding function can be stopped is displayed on the operation item, and the operation item is further displayed in a comparatively light color. Meanwhile, when the corresponding function is not activated, the controller 10 enables the option. In the present embodiment, when the option is enabled, a text "OFF" indicating that the corresponding function is already being stopped is displayed on the operation item, and the operation item is further displayed in a comparatively dark color.

When the operation item is operated by the user during display of the management screen 20, the controller 10 switches between enabling and disabling the corresponding option. Specifically, if the operation item is operated by the user when an option is enabled, the controller 10 disables the option and activates the function corresponding to the option. If the operation item is operated by the user when an option is disabled, the controller 10 enables the option and stops the function corresponding to the option.

The option 24a corresponds to the high-speed mobile communication function. To activate or stop the high-speed mobile communication function, the controller 10 activates or stops the communication unit 6b. The option 24b corresponds to the wireless LAN function. To activate or stop the wireless LAN function, the controller 10 activates or stops the communication unit 6c. The option 24c corresponds to the GPS function. To activate or stop the wireless LAN function, the controller 10 activates or stops the GPS receiver 7. The option 24d corresponds to the pedometer function. To activate or stop the pedometer function, the controller 10 activates or stops the pedometer program 9b. To activate or stop the pedometer function, the controller 10 may further activate or stop the acceleration sensor 8. The option 24e corresponds to the automatic synchronization function. To activate or stop the automatic synchronization function, the controller 10 activates or stops the synchronization program 9a.

The five options are only the examples, and therefore the controller 10 does not have to display all of the options on the management screen 20, or may display other options on the management screen 20. The options to be displayed on the management screen 20 may be previously and fixedly determined. Alternatively, when the power consumption for each function measured during operation of the mobile phone 1 is stored in the power consumption information 9d, the controller 10 may select predetermined number of functions in order from a function with the highest power consumption, and display the functions as options. In this case, the controller 10 may display all of the functions, as options, whose power consumption is higher than the threshold.

The histogram 25 visually represents the magnitude of the effect when each of the options is enabled. In the present embodiment, the histogram 25 is formed to represent, in a proportion, how much time is reduced when each of the options is enabled with respect to the charge time when all of the options are disabled. Specifically, a different color is assigned to each of setting items of the options, and a proportion of the reduced time to the charge time is represented by using the color assigned to the setting item of the corresponding option. In this way, visual representation of the proportion enables the user to easily recognize the magnitude of the effect when the option is enabled.

The histogram 26 visually represents a charging status. Specifically, the histogram 26 is formed to represent, in a proportion, how much a current charge amount is with respect to the charge amount when the battery is fully charged. In the present embodiment, a portion other than the portion in which the options are enabled in the histogram 25 has the same size as that of an uncharged portion in the histogram 26 and is arranged in parallel to the uncharged portion. The arrangement of the histogram 25 in this manner enables the user to recognize the magnitude of the effect when the options are enabled in terms of not only the charge time but also the magnitude of power consumed during charging.

The button 27 is used to close the management screen 20. When the button 27 is operated, the controller 10 closes the management screen 20. When the battery 11 is fully charged, the controller 10 also closes the management screen 20. The controller 10 may close the management screen 20 when the charge of the battery 11 is interrupted by reason that power is not supplied from an external device via the connector 12, or the like.

The controller 10 periodically recalculates a charge time in the current setting and a reduced charge time when the options are enabled and updates the contents of the management screen 20 during display of the management screen 20.

FIG. 4 is an example of the management screen 20 when the option 24a is enabled in the state illustrated in FIG. 3. Also, when the high-speed mobile communication function is stopped at the time of displaying the management screen 20, the management screen 20 as illustrated in FIG. 4 is displayed.

Because the option 24a is enabled, the text "OFF" indicating that the function corresponding to the operation item of the option 24a has already been stopped is displayed on the management screen 20 in FIG. 4, and the operation item is further displayed in a comparatively dark color. Moreover, the charge time in the current setting and the reduced charge time when the option is enabled, which are displayed as the message 21, become shorter, and these changes are reflected in the histogram 25 and the histogram 26.

FIG. 5 is an example of the management screen 20 when the button 23 is operated in the state of FIG. 3. Also, when all of the options 24a to 24e are enabled or when all of the functions corresponding to the options 24a to 24e have been stopped at the time of displaying the management screen 20, the management screen 20 as illustrated in FIG. 5 is displayed.

Because the options 24a to 24e are enabled, the text "OFF" indicating that the functions corresponding to the operation items of the options 24a to 24e have already been stopped is displayed on the management screen 20 illustrated in FIG. 5, and the operation items are further displayed in the comparatively dark color. Moreover, the charge time in the current setting, which is displayed as the message 21, becomes shorter, and the change is reflected in the histogram 25 and the histogram 26.

Figure 6:
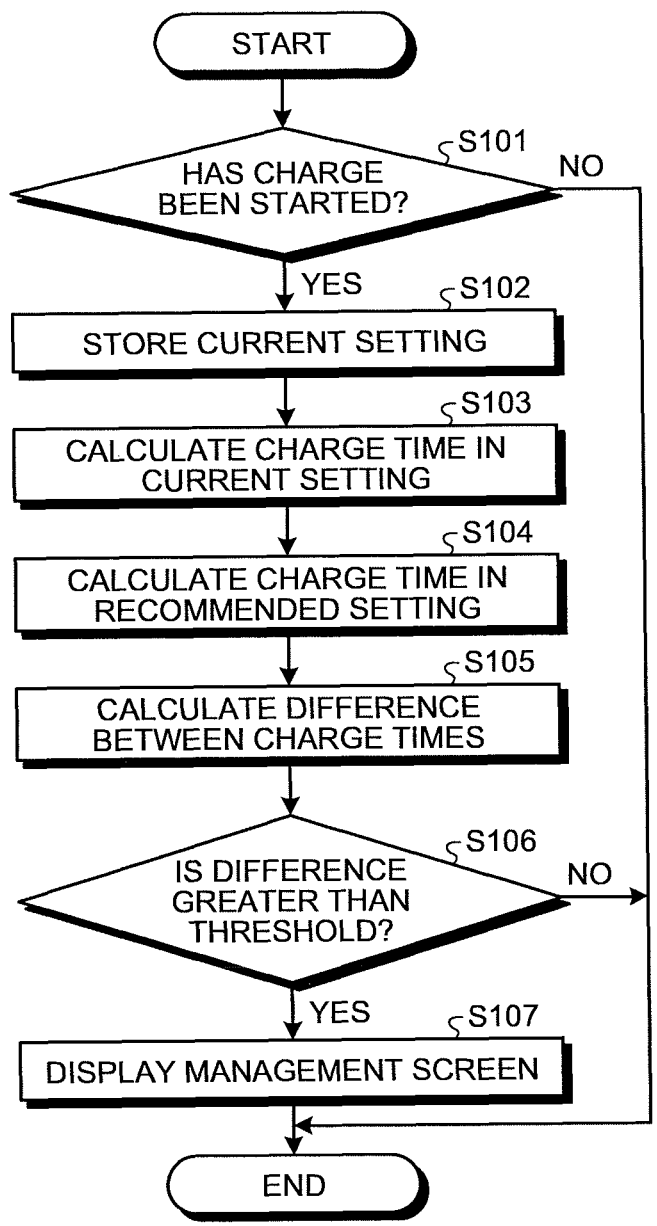
FIG. 6 is a flowchart illustrating a procedure executed by a controller when the management screen is not displayed.

Then a procedure of control executed by the controller 10 in order to reduce the charge time of the battery 11 will be explained below with reference to FIG. 6 and FIG. 7. FIG. 6 is a flowchart illustrating a procedure executed by the controller 10 when the management screen is not displayed. The procedure illustrated in FIG. 6 is implemented by the controller 10 executing the charge management program 9c, and is repeatedly executed thereby.

As illustrated in FIG. 6, at Step S101, the controller 10 determines whether the charge of the battery 11 has been started. When the charge of the battery has not been started (No at Step S101), then the controller 10 ends the procedure.

When the charge of the battery has been started (Yes at Step S101), then at Step S102, the controller 10 stores settings related to current activation statuses of the various functions. Subsequently, at Step S103, the controller 10 calculates a charge time in the current setting, and, at Step S104, calculates a charge time in a recommended setting. The recommended setting is a setting for enabling, for example, all of the options displayed on the management screen 20.

At Step S105, the controller 10 calculates a difference between the charge time calculated at Step S103 and the charge time calculated at Step S104. The difference calculated at Step S105 is a reduced charge time according to the recommended setting. At Step S106, the controller 10 determines whether the calculated difference is greater than a threshold. The threshold used at Step S106 is a value used to determine whether the recommended setting is effective enough to reduce the charge time. The threshold is set to, for example, 10% to 20% of the charge time in the current setting calculated at Step S103.

When the difference is greater than the threshold (Yes at Step S106), then at Step S107, the controller 10 displays the management screen 20 and ends the procedure. When the difference is not greater than the threshold, i.e., when the difference is not effective enough to reduce the charge time (No at Step S106), the controller 10 ends the procedure without displaying the management screen 20.

Figure 7:
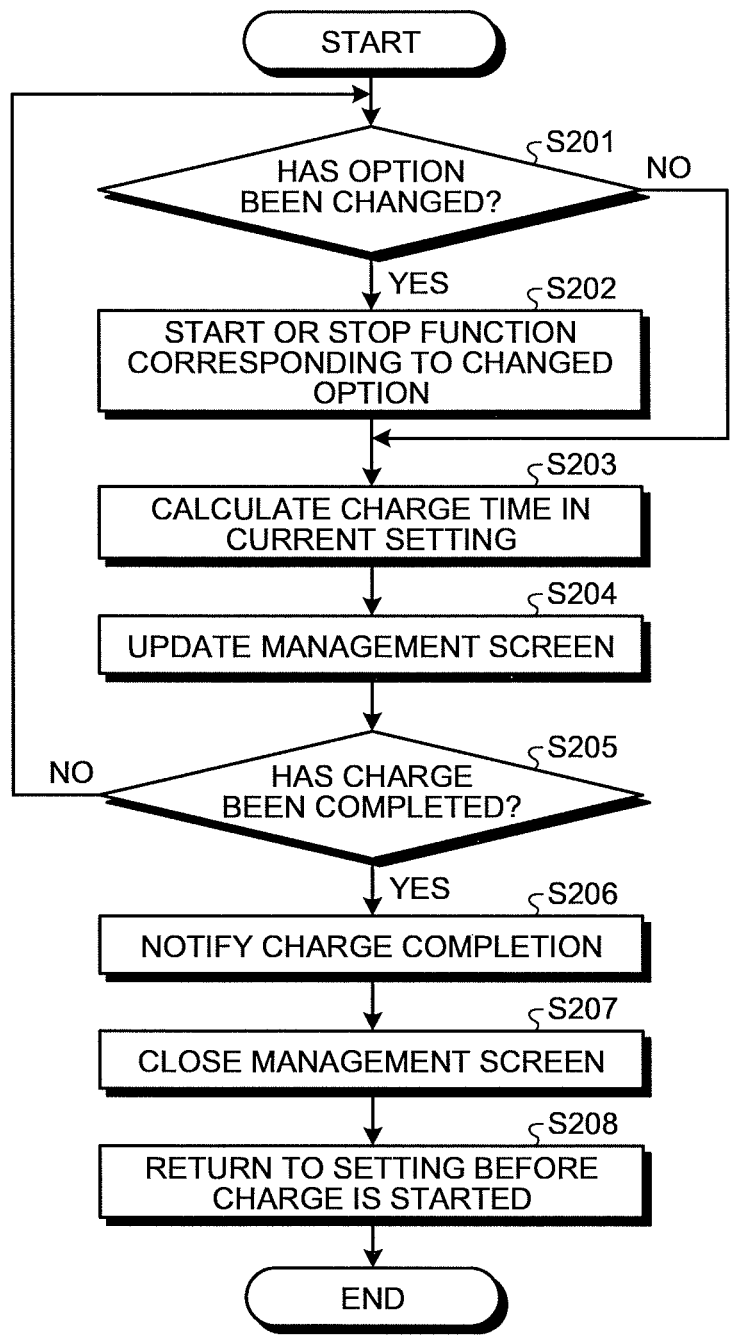
FIG. 7 is a flowchart illustrating a procedure executed by the controller during display of the management screen.

FIG. 7 is a flowchart illustrating a procedure executed by the controller 10 during display of the management screen 20. The procedure illustrated in FIG. 7 is implemented by the controller 10 executing the charge management program 9c.

As illustrated in FIG. 7, at Step S201, the controller 10 determines whether the option has been changed to be enabled or disabled. When the option has been changed (Yes at Step S201), then at Step S202, the controller 10 activates or stops the function corresponding to the changed option according to the change. When the option has not been changed (No at Step S201), the controller 10 does not change the status of the function.

Subsequently, at Step S203, the controller 10 calculates the charge time in the current setting, and, at Step S204, updates the content of the management screen 20. Thereafter, at Step S205, the controller 10 determines whether the charge of the battery 11 has been completed. When the charge of the battery 11 has not been completed (No at Step S205), the controller 10 re-executes Step S201.

When a period in which an operation performed on the operating unit 3 is not detected is continued longer than a given time while repeating Step S201 to Step S205, the controller 10 may turn the light of the display 2 off in order to suppress the power consumption. In this case, for example, when any operation is detected in the operating unit 3, the controller 10 turns on the light of the display 2. The controller 10 may stop Step S201 to Step S205 while the light of the display 2 is off.

When the charge of the battery 11 has been completed (Yes at Step S205), then at Step S206, the controller 10 notifies the user of the charge completion. For the sake of notification, the controller 10 may display a message or the like the display 2, make a sound, vibrate the mobile phone 1, or blink a lamp on and off.

Subsequently, at Step S207, the controller 10 closes the management screen 20. Then at Step S208, the controller 10 returns the function of the mobile phone 1 to the same status as that before the charge is started based on the setting stored at Step S102. The controller 10 may omit Step S102 and Step S208 or may execute them only when a predetermined setting is made by the user.

As explained above, in the present embodiment, when the charge is started, the mobile phone 1 presents the options in order to reduce the charge time, so that the user can arbitrarily select and enable any of the options. Therefore, the mobile phone 1 can reduce the charge time according to a user's use status.

For example, when the charge is wished to be urgently performed, the user enables all of the presented options. As a result, the charge time is reduced to the shortest amount of time. Alternatively, when the remaining amount of the battery 11 gets low during data communication, the user keeps the option corresponding to the high-speed mobile communication function or to the wireless LAN function disabled and enables other option. As a result, the charge time is reduced while continuing the data communication.

Moreover, in the present embodiment, the mobile phone 1 continuously displays the management screen 20 during charging unless a user's instruction or so is input. The mobile phone 1 can also redisplay the management screen 20 by user's another instruction even after the management screen 20 is closed by the user's instruction or so. Therefore, the mobile phone 1 allows the user to easily restart the function having been stopped for reduction of the charge time. For example, when a need to perform data communication arises during charging although all of the options have been enabled for urgent charging, the user has only to disable the corresponding option on the management screen 20. Therefore, the user does not have to perform any troublesome operation such as following a menu hierarchy for the purpose of activating the high-speed mobile communication function or the wireless LAN function.

The embodiment disclosed in the present application can be modified without departing the gist and the scope of the invention. Moreover, the embodiments and their modifications disclosed in the present application can be combined with each other as required. For example, the embodiment may be modified as follows.

For example, the programs illustrated in FIG. 1 may be divided into a plurality of modules, or may be combined with any other program.

In the embodiment, the mobile phone has been explained as an example of the device provided with the battery; however, the device according to the appended claims is not limited to the mobile phone. The device according to the appended claims may be a mobile electronic device other than the mobile phone. Examples of the mobile electronic device include, but are not limited to, mobile phones, tablets, mobile personal computers, digital cameras, media players, electronic book readers, navigators, and gaming devices.

In the embodiment, the mobile phone 1 is configured so as not to close the management screen 20 during charging until a user's instruction is input or the charge is completed; however, the present invention is not limited thereto. For example, the mobile phone 1 may close the management screen 20 when an operation is not performed on the management screen 20 for a given time.

In the embodiment, the mobile phone 1 is configured so as to reflect the current activation statuses of the various functions in the options displayed on the management screen 20 at the time of starting the charge; however, the present invention is not limited thereto. For example, the mobile phone 1 may activate or stop a specific function at the time of starting the charge based on the setting previously made by the user, and reflect the result thereof in the options displayed on the management screen 20. For example, when the setting to keep the pedometer function off during charging is previously made by the user, the mobile phone 1 forces the pedometer function to stop at the time of starting the charge, so that the option corresponding to the pedometer function may be enabled.

In the embodiment, the mobile phone 1 is configured so as to display the management screen 20 at the time of starting the charge; however, the present invention is not limited thereto. For example, the mobile phone 1 may display the management screen 20 when the user performs an operation to display the management screen 20.

In the embodiment, the example of executing the return process for returning the functions of the mobile phone 1 to the same status as that before the charge is started after the charge is completed has been explained; however, the timing of executing the return process is not limited thereto. For example, the mobile phone 1 may also execute the return process when the management screen 20 is to be closed according to an operation on the button 27. Alternatively, the mobile phone 1 may also execute the return process when the charge of the battery 11 is interrupted by reason that power is not supplied from an external device via the connector 12, or the like.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device comprising:
    a battery;
    a display; and
    a controller configured to cause, when a charge of the battery is started, the display to display a screen including one or more options for stopping a function in which power is consumed,
    wherein, the controller is configured to cause the display to display, for each of the options, a time value of how much a charge time of the battery is reduced when the function corresponding to the option is stopped.

2. The device according to claim 1, wherein, when a difference between a charge time of the battery in a current setting and a charge time of the battery when all of functions corresponding to the options are stopped is not greater than a threshold, the controller is configured not to cause the display to display the screen.

3. The device according to claim 1, wherein
    the controller is configured to provide the screen with a button for stopping all of functions corresponding to the options.

4. A method of controlling a device with a battery and a display, the method comprising:
    detecting a start of charging the battery;
    displaying, when the charge of the battery is started, a screen on the display, the screen including one or more options for stopping a function in which power is consumed; and
    displaying, for each of the options, a time value of how much a charge time of the battery is reduced when the function corresponding to the option is stopped.

5. A non-transitory storage medium that stores a control program for causing, when executed by a device with a battery and a display, the device to execute:
    detecting a start of charging the battery;
    displaying, when the charge of the battery is started, a screen on the display, the screen including one or more options for stopping a function in which power is consumed; and
    causing the display to display, for each of the options, a time value of how much a charge time of the battery is reduced when the function corresponding to the option is stopped.

* * * * *